April 9, 1940.  J. GALBAN Y CARLO  2,196,353
FRYING APPARATUS
Filed Oct. 24, 1938  3 Sheets-Sheet 3
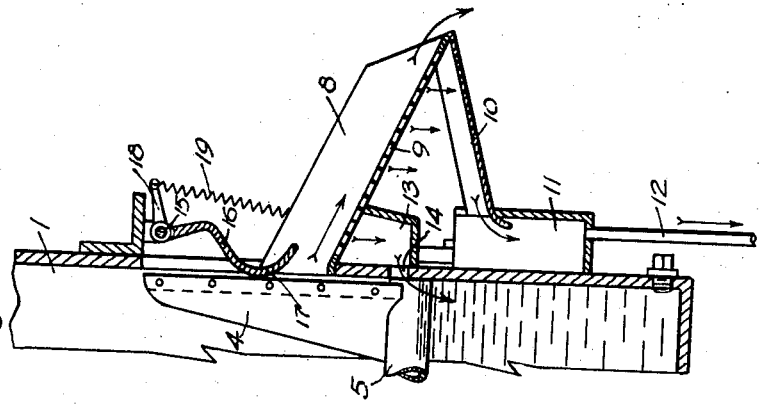
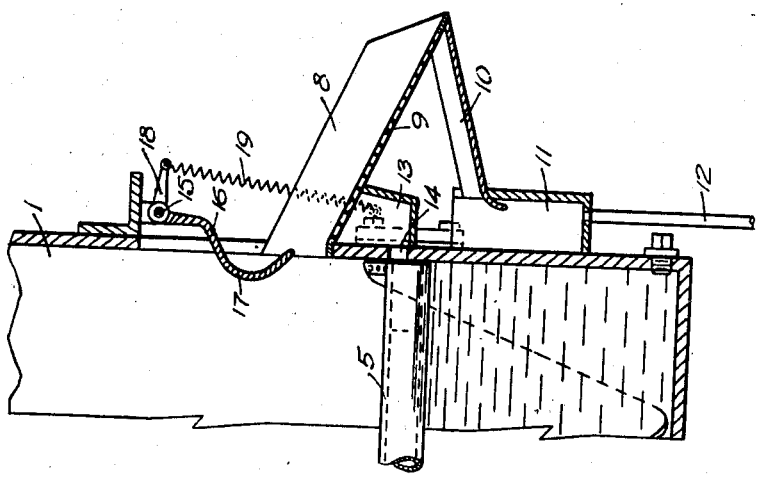
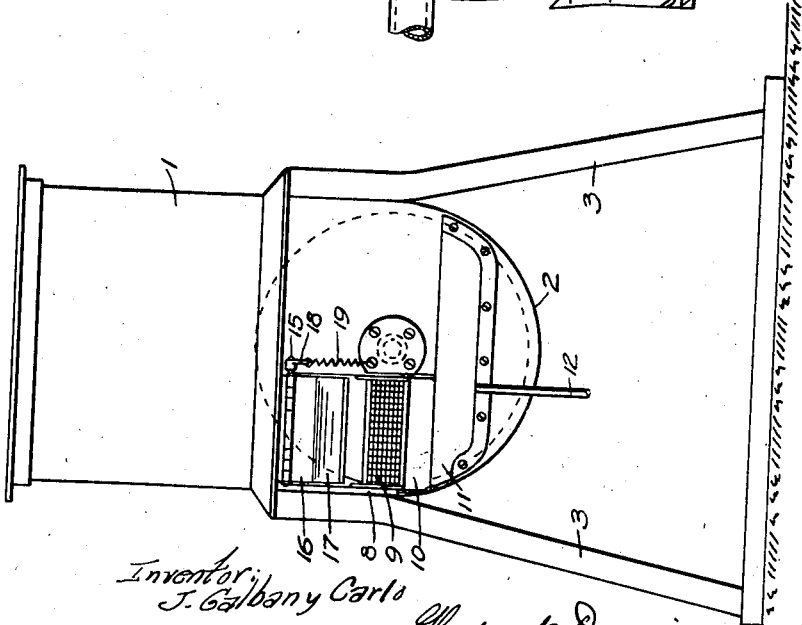

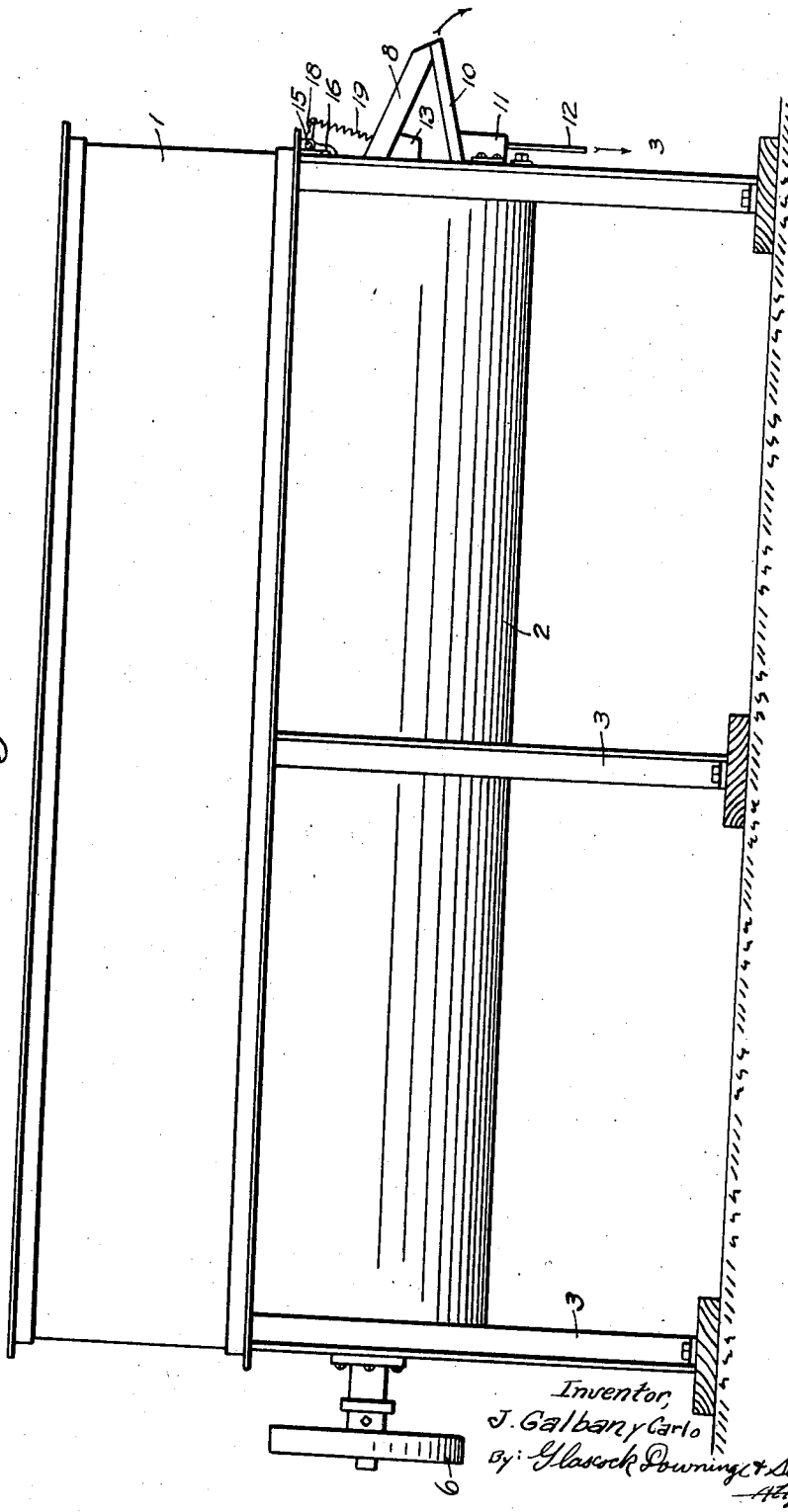

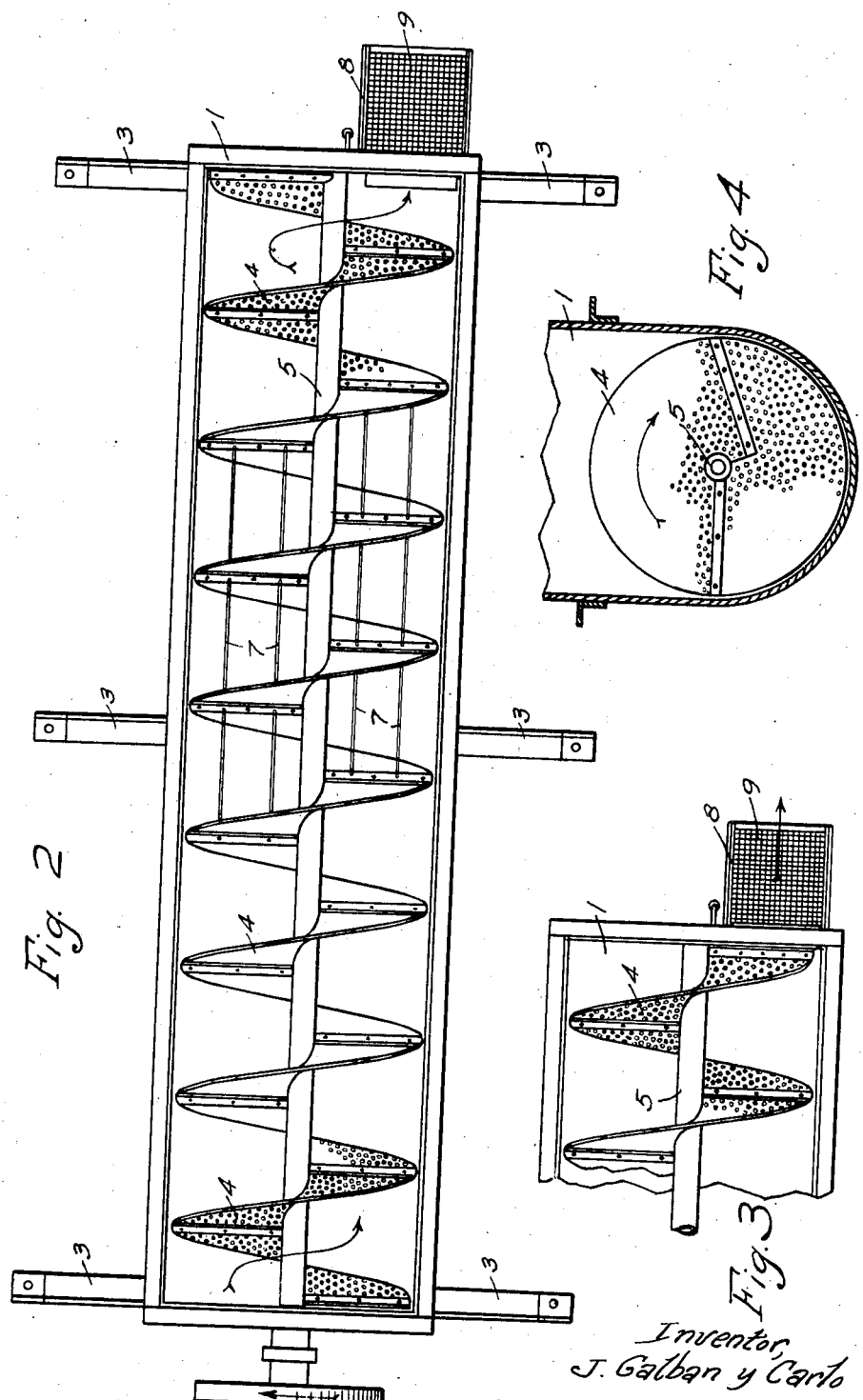

Patented Apr. 9, 1940

2,196,353

UNITED STATES PATENT OFFICE 2,196,353

FRYING APPARATUS

Juan Galban y Carlo, Habana, Cuba

Application October 24, 1938, Serial No. 236,712
In Cuba November 6, 1937

4 Claims. (Cl. 53—17)

This invention refers to an apparatus intended to fry vegetables, or fruits, and tubers or any other sort of product, and its main purpose being the provision of a machine of this sort, of continuous operation and high efficiency, and by the use of which most of the frying substance can be recovered.

Further advantages and features of the invention will be appraised in the course of this specification, which is done in accordance with the attached drawings, in which the same numerals of reference show the same parts in the different views.

In the drawings:

Figure 1 shows a side elevation view of the apparatus which is the object of the present invention.

Figure 2 is an upper plan view of same.

Figure 3 represents a partial upper plan view showing the delivering end of the device.

Figure 4 is a detail view of the last turn of the screw of the apparatus.

Figure 5 represents a front side elevation of the delivering end of the apparatus, and Figures 6 and 7 are longitudinal vertical section views, in enlarged scale, of the device.

Making reference to the drawings, the apparatus, subject matter of this invention is constituted by a rectangular tank 1, having a bottom of cylindrical shape 2, supported by suitable standards 3. In the inner part of the tank, coinciding with the cylindrical surface of the bottom of same is placed an helicoidal screw made of perforated plate 4; the shaft 5 is suitably arranged for receiving rotary movement by means of pulley 6, or any other proper means. Near to the outlet end of the helicoidal screw 4, and between certain number of its turns, traversing rods 7 are arranged. The outlet end of the apparatus is provided with delivering means which are formed by the sloped chute 8, having a bottom of wire netting 9, bearing thereunder a second chute 10, one end of which is secured to the free end of chute 8 and the other end finishes in the tank 11 where the outlet pipe 12 is connected. Under chute 8 is arranged tank 13 in connection with tank 1 by opening 14. Over shaft 15 gate 16 is mounted which includes a convexed surface 17 with level 18 operated by spring 19.

The operation of the apparatus is as follows:

Tank 1 being supplied with the frying substance, which level reaches shaft 5 of the helicoidal screw, which is slightly sloped to the outlet end of the apparatus, and the temperature of said frying substance, at a suitable degree, from a suitable source of heat, which is not shown in the drawings; the helicoidal screw receives its rotary movement as it is indicated by the arrow applied to the pulley at the left in Figure 2, and the pieces or chips of vegetables, fruits or tubers, or whatever is to be fried are continuously supplied through the inlet end of the device by mechanical means or any other means which might be thought fit and move in the direction of the arrows located inside of the tank. The turns of the screw in its rotary movement transfer the chips etc. as they are being fried towards the outlet end of the apparatus. The object of the transversal rods 7 is to sink and stir the chips etc. in the frying liquid in order to thoroughly fry them. When the end of the helicoidal screw 4 comes in contact with the convexed part 17 of gate 16 the latter is pushed against the action of spring 19 allowing the setting out of the chips or fried product through chute 8. Part of the frying liquid which is dragged along by the chips passes through the wire netting bottom 9 of chute 8 to tank 13 and therefrom returns to tank 1 by opening 4 and any part of the frying liquid falling in chute 10 is carried to tank 11 and collected through pipe 12.

I claim:

1. An apparatus for cooking food comprising a tank having a cylindrical bottom and an outlet for the cooked food located above said bottom, and a helicoidal screw housed in said tank for moving food therethrough and having one end arranged adjacent said outlet opening whereby the cooked food moving therewith is raised and discharged through said opening.

2. An apparatus for cooking food comprising a tank having a cylindrical bottom and an outlet for the cooked food located above said bottom, and a helicoidal screw housed in said tank for moving food therethrough and having one end arranged adjacent said outlet opening whereby the cooked food moving therewith is raised and discharged through said opening, and a gate arranged in said opening and engageable and movable by said screw.

3. An apparatus for cooking food comprising a tank having a cylindrical bottom and an outlet for the cooked food located above said bottom, and a helicoidal screw housed in said tank for moving food therethrough and having one end arranged adjacent said outlet opening whereby the cooked food moving therewith is raised and discharged through said opening, a gate arranged in said opening and engageable and movable by said screw, and a chute extending from said opening having openings therein and means for conducting liquid passing through the openings in the chute back into said tank.

4. An apparatus for cooking food comprising a tank having a cylindrical bottom and an outlet for the cooked food located above said bottom, and a helicoidal screw housed in said tank for moving food therethrough and having one end arranged adjacent said outlet opening whereby the cooked food moving therewith is raised and discharged through said opening, a gate arranged in said opening and engageable and movable by said screw, a chute extending from said opening having openings therein, means for conducting liquid passing through the opening in the chute back into said tank, and means for conducting a liquid passing through an opening in another portion of said chute to an outlet pipe.

JUAN GALBAN Y CARLO.